United States Patent [19]

McMurray

[11] 4,060,757
[45] Nov. 29, 1977

[54] INVERTERS HAVING A TRANSFORMER-COUPLED COMMUTATING CIRCUIT

[75] Inventor: William McMurray, Schenectady, N.Y.

[73] Assignee: General Electric Co., Schenectady, N.Y.

[21] Appl. No.: 724,402

[22] Filed: Sept. 17, 1976

[51] Int. Cl.² .......................................... H02M 7/515
[52] U.S. Cl. ...................................... 363/57; 363/135
[58] Field of Search ................ 321/2, 5, 14, 44, 45 R, 321/45 C; 307/252 M, 108

[56] References Cited

U.S. PATENT DOCUMENTS

| Re. 26,342 | 2/1968 | Bedford | 321/44 |
|---|---|---|---|
| 3,325,716 | 6/1967 | Gomi | 321/2 |
| 3,469,169 | 9/1969 | Schlabach et al. | 321/5 |
| 3,487,278 | 12/1969 | Turnbull et al. | 321/45 R |
| 3,916,290 | 10/1975 | Rao et al. | 321/45 C |

FOREIGN PATENT DOCUMENTS

| 1,406,518 | 6/1965 | France | 307/252 M |
|---|---|---|---|
| 474,084 | 10/1975 | U.S.S.R. | 321/2 |

OTHER PUBLICATIONS

IEEE Transactions on Industry & General Applications, vol. 1GA-4, No. 1, pp. 104–110, Jan./Feb., 1968.

*Primary Examiner*—William H. Beha, Jr.
*Attorney, Agent, or Firm*—Donald R. Campbell; Joseph T. Cohen; Jerome C. Squillaro

[57] ABSTRACT

In force-commutated single phase and polyphase thyristor inverters, a single commutating pulse generator produces commutating impulses for all the commutating thyristors which are individually transformer-coupled to the power circuit to turn off a selected load thyristor. Coasting thyristors to provide zero output voltage levels are also commutated without additional components. The basic commutating pulse generator has one capacitor with provision for recovering trapped energy, and pulse waveshaping and two-level overcurrent capability can be added economically.

28 Claims, 12 Drawing Figures

INVERTERS HAVING A TRANSFORMER-COUPLED COMMUTATING CIRCUIT

BACKGROUND OF THE INVENTION

This invention relates to inverters having a transformer-coupled commutating circuit, and more particularly to thyristor single phase and polyphase inverters essentially having a single commutating pulse generator that is transformer-coupled to the power circuit and controlled to effect commutation, one at a time, of all the load current carrying thyristors.

The present invention offers solutions to the following problems that can occur in other types of inverter circuits. In each case the statement of the problem is followed by prior art solutions with their disadvantages.

1. The load current that can be commutated is generally proportional to the main dc supply voltage, so that it is impractical to adjust the dc voltage in order to regulate the ac output voltage. Also, when the dc voltage varies about a fixed nominal value, the minimum voltage determines the size of the capacitor. While it is possible to couple, by transformer action or otherise, an independently controlled commutating pulse into the main circuit having adjustable dc voltage, other techniques generally require a substantial number of accessory components, increasing the complexity and expense.

2. At least one commutating capacitor per pair of main thyristors is normally required. A single commutating capacitor can be shared by the several legs of a polyphase inverter, but prior art methods require at least one auxiliary thyristor for each main thyristor, plus several more auxiliary thyristors.

3. In circuits using auxiliary thyristors to generate the commutating impulse, at least one auxiliary device for each main thyristor is usually necessary. Other inverters having a transformer-coupled commutating circuit with one auxiliary thyristor per pair of main devices have encountered difficulties involving trapped energy.

4. When the ac load is capacitive or regenerative, the commutating pulse may be redundant, but it is generally necessary to generate a high current pulse in order to reverse the charge on the commutating capacitor to be ready for the next commutation. Chopper-type commutating circuits can be controlled to avoid redundant commutations, but are more complex, and transformer-coupled circuits with this capability again have problems with trapped energy.

5. Redundant commutations can result in a rise of output current into overload conditions, but the rise cannot be halted until recovery is completed, which may be long in some cases. Some prior art circuits have a very short redundant commutating time, however the present inverter need have no delay at all.

6. The magnitude of the commutating impulse must be sized to extinguish the worst-case peak overload current even though the load may be small. Multi-level commutating pulse generators are conceivable but prohibitively complex and expensive when a separate pulse generator is required for every pair of main thyristors.

7. Waveshaping the commutating pulses to improve the efficiency of operation usually requires many additional components in a polyphase inverter and is not practical. The drawbacks in paragraph 6 apply to waveshaping as well.

8. Most commutation circuits involve inevitable losses that are dissipated in damped oscillations or otherwise. A known commutation circuit without such losses uses a high voltage auxiliary thyristor for every main device and an expensive magnetic component.

9. Some circuits require high voltage transformer windings and auxiliary diodes to recover energy trapped in reactive elements after commutation. Prior art approaches involve greater complexity for avoiding, minimizing, recovery, or dissipation of trapped energy.

10. Most inverters have only two levels of output voltage. The addition of a third (zero voltage) output level can be accomplished using inverse-parallel coasting thyristors across the load, but this technique has not been employed often in the past because complex auxiliary circuitry was needed to commutate the coasting thyristors.

SUMMARY OF THE INVENTION

Within the scope of the invention as broadly defined, the transformer-coupled auxiliary commutating circuit can be utilized in single phase half-bridge and center-tapped load inverter configurations, although the full potentialities are more evident with the addition of coasting thyristors and the combination of several such inverter units into full bridge and polyphase inverters.

In the exemplary half-bridge inverter unit according to one embodiment, a single coupling transformer has a center-tapped primary winding in series with the main thyristors and functions as an input terminal spanning reactor and to couple commutating current pulses to the main thyristors that are produced by a single commutating pulse generator. A feedback rectifier is connected directly across each main thyristor or to taps on the primary winding to apply a reverse voltage to the main thyristor during commutation. The commutating pulse generator comprises a main commutating capacitor and a series-connected auxiliary thyristor for initiating discharge of the capacitor through the secondary winding. A rebound circuit, such as a rectifier and inductor in series directly across the capacitor, recovers trapped energy; and recharge means, such as a recharge thyristor in series with the rebound inductor and capacitor between the terminals of an auxiliary dc supply, recharges the capacitor to an initial voltage which, upon transformation into the primary winding, is higher than the input voltage with the same polarity. With this arrangement, the commutating impulse is regulated independent of the input voltage and load current. The auxiliary thyristor is fired in sequence to commutate both main thyristors, but firing is suppressed for redundant commutations and then the incoming main thyristor is simply fired. Opposing polarity coasting thyristors can be added with connections to taps on the primary winding to provide a third (zero) output voltage level, and these are turned off in the same manner by firing the auxiliary thyristor. In another half-bridge embodiment, a pair of coupling transformers with separate secondary windings are selectively connected to the commutating pulse generator by a pair of auxiliary thyristors. Inverse-parallel coasting thyristors across the load are also turned off by firing one of the auxiliary thyristors.

Larger inverter systems with a plurality of the inverter units, such as a single phase bridge or three phase inverter, require only the basic commutating pulse generator with one commutating capacitor assuming that all the power thyristors are commutated sequentially. Furthermore, each inverter unit has one (or two) coupling transformers with secondary windings associated with an auxiliary thyristor to select the power thyristor being commutated and steer the commutating impulse. In view of the reduced component count, it becomes economical to use a more complex impulse generator with added features, as for example, a square pulse network for pulse waveshaping, and an overcurrent pulse circuit with a paralleled capacitor for two-level pulse magnitude capability. Features for controlling the capacitor voltage are also described. The advantages of the inventions are given at the end of the specification in numbered paragraphs corresponding to those above.

DESCRIPTION OF THE PREFERRED EMBODIMENTS

The force-commutated thyristor inverter in which the commutating pulse generator is coupled to the main power circuit by means of a transformer as herein described, incoporates a number of features that result in an overall improvement and has advantages in certain applications. The structure of a preferred form of the transformer-coupled commutating circuit and its operation for both necessary and redundant commutations are explained first with regard to the basic single phase half-bridge configuration in FIG. 1. The full potentialities are not realized, however, until a plurality of half-bridge inverter units are combined into a larger system such as a three-phase inverter or a single phase full bridge inverter. In this case, the single commutating pulse generator with only one main commutating capacitor is time-shared in a controlled manner among the inverter units and commutates all the load current thyristors so long as the commutations are sequential.

Figure 1:
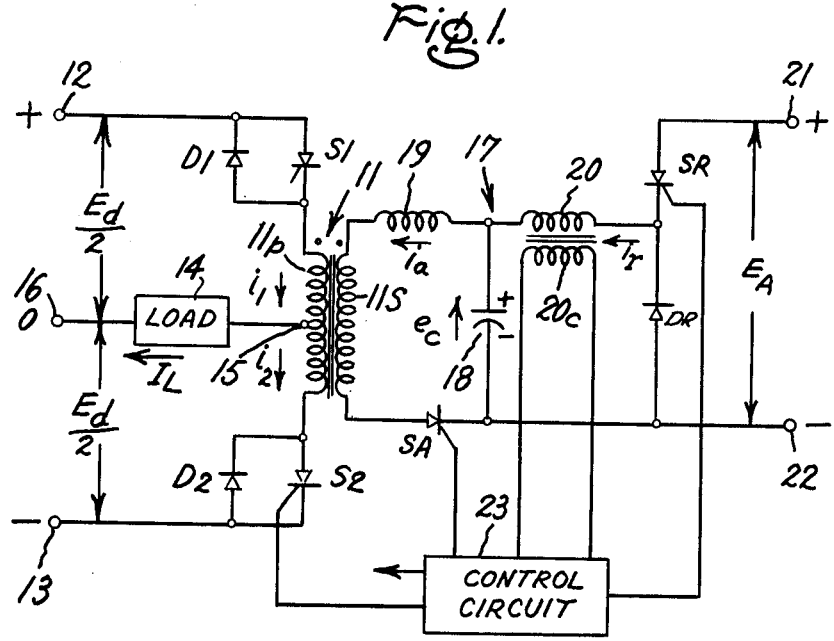
FIG. 1 is a schematic circuit diagram of a half-bridge thyristor inverter with a transformer-coupled commutating circuit according to the preferred embodiment of the invention.

In FIG. 1, the main power circuit comprises a first main thyristor S1 connected in series with the center-tapped primary winding 11p of a coupling transformer 11 and also with a second main thyristor S2 between a pair of positive and negative input dc supply terminals 12 and 13. Feedback rectifier diodes D1 and D2 are in inverse-parallel with the respective main thyristors S1 and S2, which preferably are silicon controlled rectifiers. Power bidirectional conducting triacs can be substituted for the SCR-diode combinations. The ac load 14 is connected between an output terminal 15 established at the center tap of primary winding 11p and the dc neutral 16 or midpoint of the dc source, assumed to be a stiff voltage $E_d$. Alternatively, one end of the load can be connected to the junction of a pair of capacitors in series between input terminals 12 and 13, and an output transformer can be used. Coupling transformer 11 functions dually as an input terminal spanning reactor and couples to the main power circuit commutating impulses for both main thyristors which are generated by a single commutating pulse generator indicated generally at 17. Typically, coupling transformer 11 is a transformer with an air gap to determine the magnetic inductance.

In commutating pulse generator 17, a main commutating capacitor 18 and an auxiliary thyristor SA are effectively in series across secondary winding 11s, and the commutating pulse loop usually includes a commutating inductor 19, part of which may be leakage reactance of the transformer. Assuming that commutating capacitor 18 has an initial voltage with the polarity indicated, commutation is initiated by turning on auxiliary thyristor SA to discharge the capacitor through commutating inductor 19 and secondary winding 11s. The commutating pulse generator also includes rebound circuit means comprising a rebound rectifier diode DR, and rebound inductor 20 directly in series across the commutating capacitor for recovering energy trapped in the commutating pulse loop after commutation is effected and returning it to the capacitor with the proper polarity of voltage required for the next commutation. Additional energy is drawn from an independently controllable auxiliary supply of voltage $E_A$ through a recharge thyristor SR to make up for the energy transferred to the main power circuit plus losses so that capacitor 18 is maintained at a controlled initial voltage for each commutation. To this end, recharge thyristor SR is effectively in series with rebound inductor 20 and commutating capacitor 18 between a pair of auxiliary supply input terminals 21 and 22. Auxiliary supply $E_A$ may be separate from the main supply $E_d$, or it may be the same source.

The turns ratio of coupling transformer 11 is selected to suit the needs of the application, but a unity turns ratio is assumed to simplify the analysis. To operate properly, the initial commutating capacitor voltage, upon transformation into coupling transformer primary winding 11p, is higher than input voltage $E_d$ and has the same polarity. A suitable control circuit 23 of a type evident to those skilled in the art supplies gating signals in a prescribed sequence to both main thyristors and to auxiliary thyristor SA and recharge thyristor SR, although the last is not always required. In an optimum arrangement, the firing of recharge thyristor SR is controlled relative to the condition of commutating capacitor 18 or rebound inductor 20. For this reason, as will be further explained, rebound inductor 20 can have an additional inductively coupled controlled winding 20c to supply sensory information to a recharge thyristor firing control circuit. The total interval of operation of the transformer-coupled commutating circuit is relatively short compared to the intervals of conduction of main thyristors S1 and S2. For example, for a 20 microsecond turn-off time thyristor, the total interval between turn-on of auxiliary thyristor SA and recharge of capacitor 18 to the desired initial voltage is less than 300 microseconds. In this configuration, auxiliary thyristor SA serves to generate the commutating impulse for both main thyristors S1 and S2.

Figure 2:
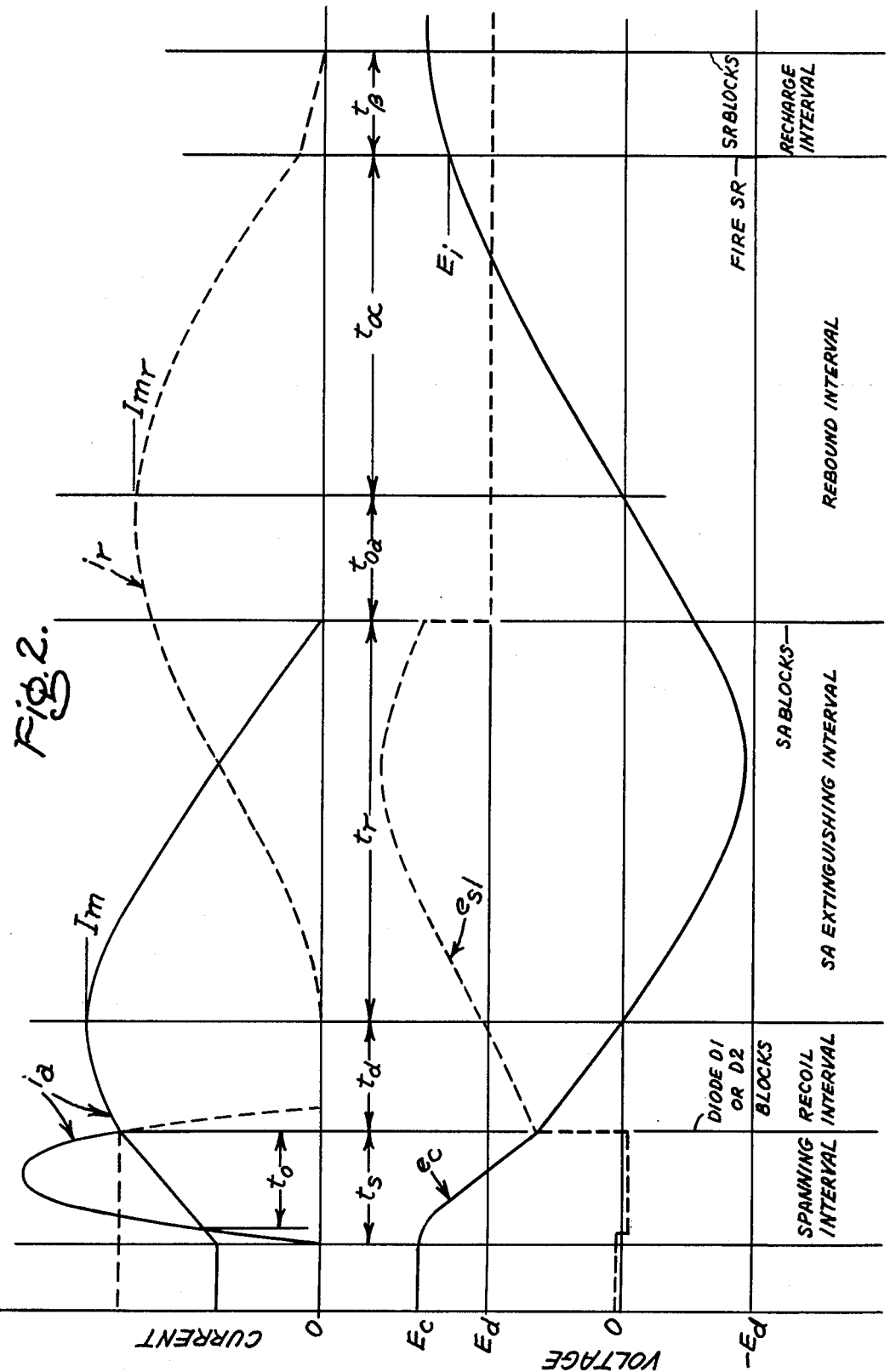
FIG. 2 shows current and voltage waveforms useful in explaining commutation of a main thyristor.

A detailed explanation of a necessary commutation of load current $I_L$ from main thyristor S1 to feedback diode D2 will be given with reference to the current and voltage waveforms in FIG. 2. In these diagrams $i_a$ is the current in auxiliary thyristor SA, $i_r$ is the current in rebound inductor 20, $e_c$ is the instantaneous voltage on commutating capacitor 18, and $e_{S1}$ is the voltage across main thyristor S1. Various topological modes during the necessary commutation are separated by the vertical lines and designated, in order, as the spanning interval, recoil interval, SA extinguishing interval, rebound interval, and recharge interval. As initial conditions, it is assumed that main thyristor S1 is conducting, thyristors S2, SA, and SR are nonconducting, there is an initial voltage $E_c$ on capacitor 18 higher than input voltage $E_d$, and a current $I_L$ is flowing into a constant-current sink load throughout the commutating interval. Commutation begins when auxiliary thyristor SA is fired to discharge commutating capacitor 18 through commutating inductor 19 and secondary winding 11s. In the commutating pulse loop there is effectively a series resonant circuit which generates a half sinusoidal pulse of current. Further assuming that dot ends of the transformer windings have a positive polarity, the voltage induced in coupling transformer 11 rises to be equal to the input dc voltage $E_d$, at which level it is clamped as feedback diode D2 is forced into conduction and first main thyristor S1 and then feedback diode D1 conduct. With tight coupling between the windings of the transformer, the voltage difference $e_c-E_d$ appears across commutating inductor 19, which includes any transformer leakage, and drives a half-sinusoid pulse of current $i_a$ (see FIG. 2) around the secondary loop. In the main power circuit the commutating current pulse opposes the load current and first extinguishes any current in main thyristor S1, with the excess then flowing through feedback diode D1 to be returned to the dc supply while providing turn-off time $t_o$ to thyristor S1 until it recovers its blocking ability. Thus, during the spanning interval $t_s$, current $i_2$ as identified in FIG. 1 is always negative (diode D2 is conducting), while current $i_1$ reverses from positive to negative and energy is transferred from the commutating circuit to the main dc supply. Capacitor voltage $e_c$ continues to decrease, and the spanning interval ends when diode D1 blocks and thyristor S1, having been turned off, should not recommence conduction.

The topology mode of the circuit now switches since only diode D2 and auxiliary thyristor SA are now conducting and the corresponding interval can be called the recoil interval $t_d$. In the primary circuit, the steady load current $I_L$ flows through diode D2 and there is no further current disturbance, but the load voltage deviates from the value $-E_d/2$ by the amount induced in the lower half of the reactor winding when the oscillation continues in the secondary circuit. In the commutating pulse loop, the resonant frequency changes to a lower value and the impedance increases. During the recoil, energy stored as magnetic flux in the transfomrer continues to affect both the primary side load and the secondary side commutating capacitor. However, the amplitude of oscillation is determined by the trapped energy in capacitor 18, commutating inductor 19, and coupling transformer 11. According to FIG. 2, the peak current $I_m$ is attained when the capacitor voltage reaches zero after the current interval $t_d$.

Figure 3:
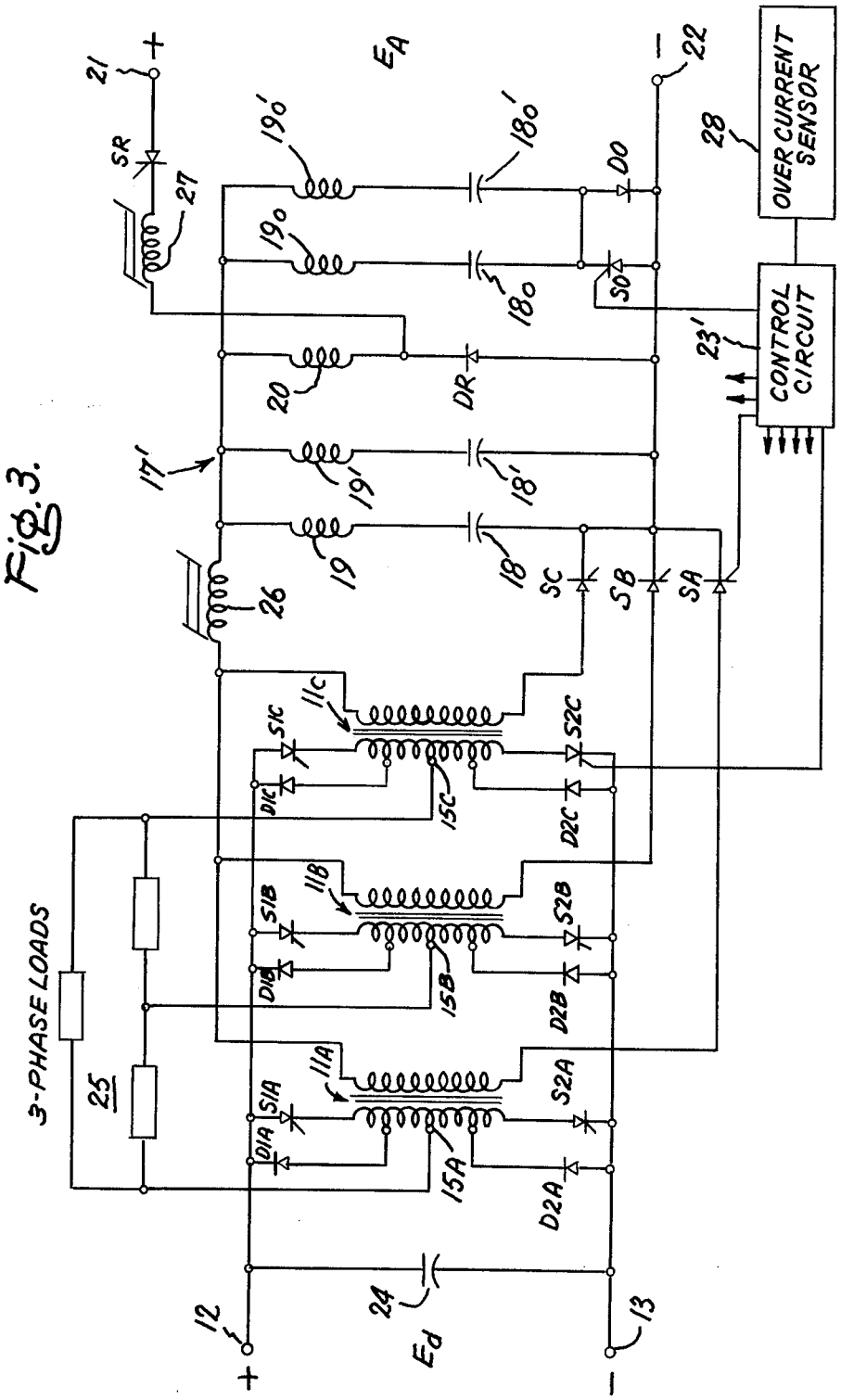
FIG. 3 is a schematic circuit diagram of a three-phase bridge inverter with a shared transformer-coupled commutating pulse generator that additionally includes a two-level square pulse-forming network.

When the commutating capacitor voltage reverses, rebound diode DR begins to conduct and current $i_r$ builds up in rebound inductor 20 as seen by the heavy dashed line at the top of FIG. 3. The circuit topology changes, in that diodes D2 and DR and auxiliary thyristor SA are now conducting, and the auxiliary thyristor extinction interval $t_r$ begins. Trapped energy from the commutating pulse loop is completely discharged and auxiliary thyristor SA turns off when loop current $i_a$ drops to zero. During this interval, it is noted that the peak value of $e_{S1}$, which is the reverse voltage applied to thyristor S1, is coincident with and determined by the peak reverse value of capacitor voltage $e_c$. Since rebound diode DR is now conducting, the peak reverse capacitor voltage, and thus the maximum reverse voltage applied to thyristor S1, is reduced from what it otherwise would be by using this configuration of rebound circuit.

The circuit topology now switches, with only diodes D2 and DR conducting, and the rebound interval begins. The main power circuit is now completely divorced from subsequent events in the transformer-coupled commutating circuit, where capacitor 18 continues to ring around with rebound inductor 20. The turn-off time available for auxiliary thyristor SA is the time $t_{oa}$ after which the capacitor voltage becomes positive again. The peak current $I_{mr}$ in rebound inductor 20, of course, is at the capacitor voltage zero. Ordinarily the stored energy in this inductor upon discharge into the commutating capacitor is insufficient to raise the capacitor voltage to the desired initial voltage $E_c$. The desired value of capacitor voltage $E_c$ is regained by firing recharge thyristor SR at the proper time, $t_a$, during the rebound interval. This extinquishes diode DR and connects commutating capacitor 18 and rebound inductor 20 to the auxiliary voltage source $E_A$. As was mentioned previously, a technique and control circuit for firing recharge thyristor SR at the proper time to make up for losses is described later. For good results, $E_c$ is approximately $2E_A$. Recharging ends when the rebound current $i_r$ becomes zero and recharge thyristor SR blocks after the time $t_\beta$.

At the completion of operation of the commutating circuit, feedback diode D2 is still conducting and incoming main thyristor S2 is also supplied with a gating signal, allowing the load current to reverse at will. A minor variation in the sequence of topolgoy modes for a necessary commutation occurs when the capacitor voltage becomes zero before the end of the spanning interval. Rebound diode DR now begins conducting before feedback diode D1 in the main power circuit has been extinguished. Thus, there is a change in the recoil interval topology and a consequent change in the mathematical analysis of the circuit during the recoil interval. The operation of the commutation circuit for the alternative mode is not significantly different so as to warrant extended discussion, and both the rebound interval and recharge interval are essentially the same as before. The commutation of main thyristor S2 after an interval of conduction is also initiated by firing auxiliary thyristor SA. The transformer-coupled commutating circuit operates in the identical fashion, and is clear from the foregoing extensive discussion. In operation, the commutating ability of the circuit in terms of current level is determined by the voltage difference $E_c - E_d$. Hence, when the main dc voltage $E_d$ is variable or is intentionally adjusted to control the ac output voltage, then it is advantageous to maintain this voltage difference constant, in order to commutate the same current at all voltage conditions but not have excessive currents generated when the dc voltage $E_d$ is high. This is accomplished by controlling $E_A$ as a function of $E_d$, by further controlling the recharge thyristor firing angle, or a combination of both methods. In general, however, the commutating pulse magnitude can be made independent of the dc supply by controlling the auxiliary supply or recharge thyristor SR.

In redundant commutation situations, it is not necessary to operate the commutation circuit, and a redundant commutation is averted by suppressing the firing of auxiliary thyristor SA and simply firing the incoming main thyristor S1 or S2. Commutation in an inverter is termed redundant when the nature of the load is such that the instantaneous load current is flowing through a feedback diode at the time of switching. For example, if the load current is initially flowing in feedback diode D1 at the time switching is required, then turning off main thyristor S1 is redundant. In most commutation schemes, a capacitor discharge will take place because it cannot be avoided (as in complementary commutation) or is required to prepare the capacitor for the next commutation (as in most auxiliary commutated circuits). Instead of firing auxiliary thyristor SA, which could be done, the losses and disturbance involved are avoided by simply firing incoming main thyristor S2. As initial conditions, in FIG. 1, load current $I_L$ is now flowing into the primary winding center tap and through one-half of primary winding 11p and diode D1. During the spanning interval, both diodes D1 and incoming main thyristor S2 are conducting, and there is a natural commutation from diode D1 to thyristor S2 when the circuit conditions permit. Similarly, redundant commutations of thyristor S2 are avoided in those instances where the load current is then in feedback diode D2, by firing the opposing incoming main thyristor S1 to permit a natural commutation of current from diode D2 to thyristor S1. Since current monitors are usually provided to detect overcurrents and initiate corrective action, modification of the monitor to determine the polarity of current and suppress the gating signal to auxiliary thyristor SA in the proper instances is not difficult or expensive.

The full potentialities of the present transformer-coupled commutating circuit become more evident in full bridge and polyphase circuits constructed with a plurality of the half-bridge inverter units with a single commutating pulse generator which is individually transformer-coupled to the respective inverter units. The size of the main commutating capacitor is selected to commutate only one load current carrying thyristor at a time, and accordingly there is provision for steering the commutating current pulse to a designated inverter unit. The reduction in the number of commutating capacitors makes a more sophisticated pulse generator practical, as will be explained. The three-phase bridge inverter in FIG. 3 is exemplary of the practice of the invention. In this circuit, three of the half-bridge inverter units of the type shown in FIG. 1 are connected between input dc terminals 12 and 13, and in the respective half-bridge units the components are identified by corresponding numerals with a suffix to indicate the A, B, and C phases. The main dc source $E_d$ must have a low impedance to the excess commutating pulse current, and a filter capacitor 24 at the input may be required. A delta-connected three-phase load 25 is connected between the respective output terminals 15A, 15B, and 15C at the center-taps of the primary windings of the three separate coupling transformers.

To time-share commutating pulse generator 17', the commutating current pulse is directed to the respective coupling transformer secondary windings by means of three auxiliary thyristors SA, SB, and SC. The more complex commutating pulse generator includes a square pulse waveshaping network wherein a second commutating capacitor 18' and second commutating inductor 19' are in series across main capacitor 18 and commutating inductor 19. Assuming that capacitor 18' has one-ninth the capacitance value of capacitor 18, while inductors 19' and 19 are equal, the supplementary components are tuned to resonance at the third harmonic of the fundamental pulse frequency and result in a nearly square commutating pulse. A square pulse produces a longer turn-off time for a given amount of capacitor charge. A series saturable reactor 26 is optionally included in the commutating pulse loop, and likewise another saturable reactor 27 is directly adjacent to recharge thyristor SR.

In normal operation, the six main thyristors are turned on and commutated off sequentially to apply polyphase ac output voltage to the load in the order S1A, S2C, S1B, S2A, S1C, and S2B. Within each inverter unit, of course, the two main thyristors conduct alternately for approximately 180° intervals. To couple commutating pulse generator 17' to a particular coupling transformer to commutate off the selected main thyristor according to the sequence just given, auxiliary thyristors SA, SB, or SC are gated. Although there are two conducting main thyristors in different inverter units at any given time, only the selected main thyristor is commutated off. The reduction in component count as compared to conventional prior art polyphase inverters is evident. The minimum number of auxiliary thyristors is one-half the number of main thyristors plus one more for recharging. Essentially, only one main commutating capacitor is required, and the other commutating pulse generator components are optional. Saturable reactor 26 limits di/dt in all the auxiliary thyristors and saturable reactor 27 also has a di/dt limiting function.

A modification of the half-bridge inverter unit in FIG. 3 is that the feedback diodes are connected to taps on the primary winding of the respective coupling transformer rather than being directly in inverse-parallel across the corresponding main thyristor. Consequently, a higher reverse voltage in the range of about 20–50 volts is applied to the main thyristors after they have been turned off, which generally reduces their turn-off time. For example, with thyristor S1A initially conducting the load current, auxiliary thyristor SA is fired to generate a commutating pulse of current that is coupled into the primary winding of coupling transformer 11A. During the spanning interval, the pulse is fed into the dc supply via feedback diode D2A and thyristor S1A, until the latter device blocks, after which the excess pulse current is transferred to feedback diode D1A. During the spanning interval, the section of the primary winding between the diode taps spans the dc voltage $E_d$ and a fraction of this is induced in the end section of the winding to apply the constant reverse voltage across thyristor S1A. During sequential operation of the commutating circuit, in particular during the SA extinction interval, a slightly higher peak forward voltage is applied to main thyristor S1A in the tapped arrangement as compared to the untapped arrangement in FIG. 1. Furthermore, incoming main thyristor S2A should not be gated until auxiliary thyristor SA has turned off and the trapped energy has been removed from the coupling transformer. Otherwise, a loop via S2A, D2A, and the lower tapped section of the primary winding is established for current circulation at zero voltage preventing recovery of the trapped energy. For this reason, a tapped arrangement of the spanning reactor cannot be used in similar complementary-commutated inverters which are the subject of Reissue patent 26,342. Redundant commutations are avoided in the manner previously discussed by suppressing firing of the appropriate auxiliary thyristor and firing the opposing incoming main thyristor.

Another optional feature of the more complex commutating pulse generator 17' is the addition of an overcurrent commutating pulse circuit. This can take the form of a second square pulse network wherein capacitors 18o and 18o' are respectively identical to capacitors 18 and 18' and inductors 19o and 19o' are identical to inductors 19 and 19', the second network being connected in parallel with the first via overcurrent auxiliary thyristor SO and its inverse diode DO. This provides a two-level commutating ability. For normal values of load current, control circuit 23' fires only auxiliary thyristors SA, SB, or SC. Upon sensing of overload current values by overcurrent sensor 28 or the same monitors mentioned previously, thyristor SO is fired in addition to the appropriate one of the others for the phase being commutated. The magnitude of the commutating pulse current $i_a$ is doubled assuming that the two square pulse networks are the same. This technique improves the efficiency in normal operation, since the pulse does not always need to match the peak overload current.

Figure 4:
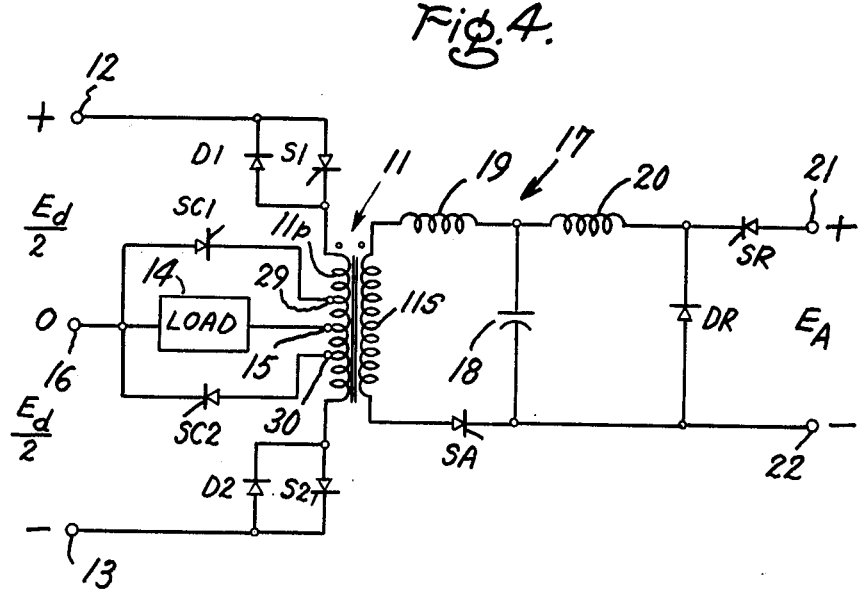
FIG. 4 is a schematic diagram similar to FIG. 1 of the half-bridge inverter modified to include coasting thyristors which are also force-commutated by the transformer-coupled commutating circuit.
Figure 5:
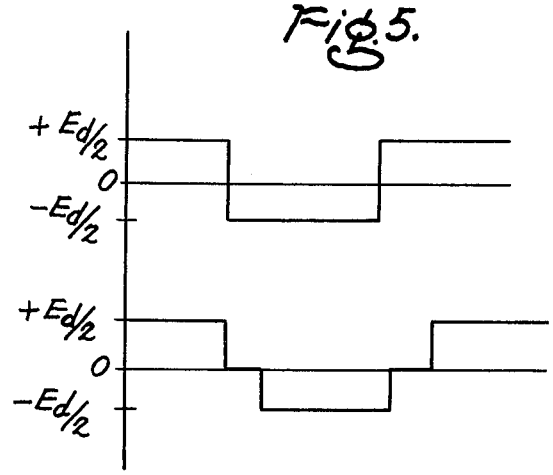
FIG. 5 shows ac output voltage waveforms applicable, respectively, to FIG. 1 and FIG. 4.

FIG. 4 shows the addition of load current-carrying, coasting thyristors SC1 and SC2 to the basic half-bridge inverter unit of FIG. 1. A single coupling transformer 11 and auxiliary thyristor SA are sufficient to provide for forced commutation for both a pair of main thyristors S1 and S2 and a pair of coasting thyristors SC1 and SC2 when the latter devices are effectively connected in opposition across the load between taps on primary transformer winding 11p and dc neutral terminal 16 or the midpoint of the dc supply. The successive commutations of course are sequential. Taps 29 and 30 for the respective coasting thyristors are at either side of center tap 15 by a like number of turns. The ac output voltage waveform for FIG. 1 as given at the top of FIG. 5 switches directly between the two possible voltage levels, $+E_d/2$ and $-E_d/2$. The addition of opposing polarity coasting thyristors in FIG. 4 adds a zero voltage output level to result in an ac output voltage waveform as given at the bottom of FIG. 5.

Forced commutation from main thyristor S1 to coasting thyristor SC1 takes place in two stages. The first stage occurring immediately after auxiliary thyristor SA is fired is a spanning interval in which thyristor S1 is extinguished and the load current is completely transferred to diode D2 at the time when diode D1 blocks after having carried the excess current. Coasting thyristor SC1 is now fired, initiating the second stage in which diode D2 is commutated off naturally and the load current transfers to the zero voltage coasting loop formed by thyristor SC1 and load 14. The commutating circuit continues to ring around the secondary windings of the coupling transformer and recovers in the same manner as before. At this point, coasting thyristor SC1 is conductive and the ac output voltage is at the zero level. Forced commutation from coasting thyristor SC1 to feedback diode D2, and transfer of the current at will to main thyristor S2, requires a separate operation of the commutating circuit and likewise takes place in two stages. Following the firing of auxiliary thyristor SA, coasting thyristor SC1 is first extinguished by the commutating pulse forced into the dc source via diode D2. The polarity of voltage induced in primary winding 11p is such that tap 29 is always positive with respect to center-tap 15, thereby applying a positive voltage to the cathode while the anode is at zero volts. When thyristor SC1 blocks, the excess current pulse is forced into diode D1, causing the transformer primary windings to span the dc voltage, applying reverse voltage to the coasting thyristor to ensure its proper recovery. If the coasting thyristors were connected to the center tap 15, their extinction would be uncertain and dependent on the relative stray impedances between the topology modes. The spanning interval ends when diode D1 blocks, leaving diode D2 conducting the load current while the commutating circuit recovers as previously described.

In similar fashion, a conducting main thyristor S2 is commutated off and the current transferred to coasting thyristor SC2 in two stages initiated by again firing auxiliary thyristor SA. During the spanning interval, thyristor S2 is extinguished and the load current is completely transferred to diode D1 at the time when diode D2 blocks after having carried the excess pulse current. Coasting thyristor SC2 is now fired, commutating diode D1 off naturally as the load current transfers to the zero voltage coasting loop. The commutating circuit continues its recovery. Upon next firing auxiliary thyristor SA to commutate off coasting thyristor SC2, it is seen that tap 30 is negative with respect to center-tap 15, thereby applying reverse voltage to thyristor SC2. It should be noted that during the time primary winding 11p spans the dc input terminals, all four thyristors in the main power circuit are reverse-biased. Thus, in case of a fault, the auxiliary thyristor SA can be fired and an attempt will be made to turn off whichever main device is conducting, without need to note the exact cause or location of the problem. Also, for situations in which the polarity of load current is such that forced commutation would be redundant, auxiliary thyristor SA need not be fired. For example, natural commutation from diode D1 to coasting thyristor SC2 is obtained by simply firing thyristor SC2, and in like manner transfer of current from coasting thyristor SC2 to main thyristor S2 is achieved simply by firing thyristor S2.

Figure 6:
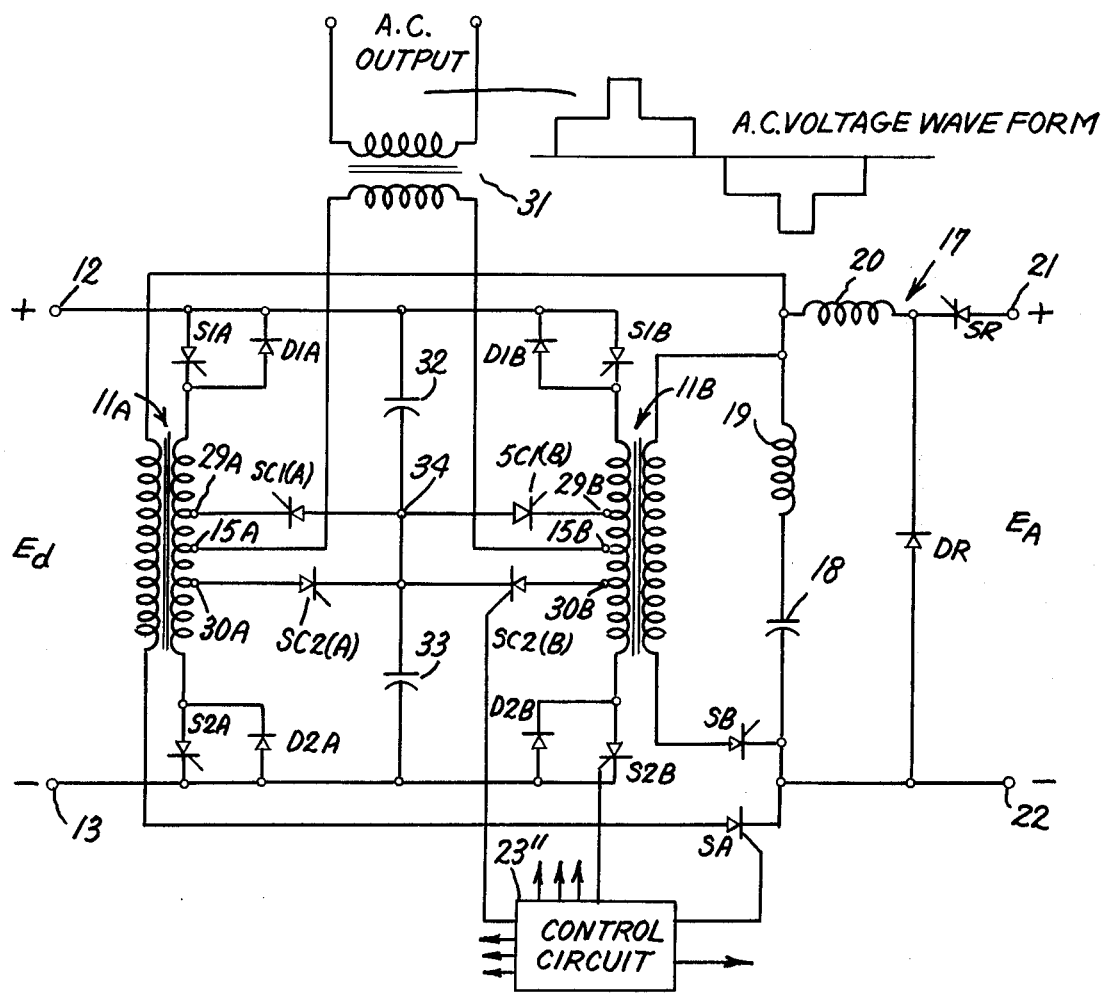
FIG. 6 is a schematic circuit diagram of a single phase full bridge inverter with a shared transformer-coupled commutating circuit and coasting thyristors connected to the midpoint of the dc supply.

Two half-bridge inverter units with coasting thyristors of the type shown in FIG. 4 are combined in FIG. 6 into a single phase full bridge inverter having a common commutating circuit. Corresponding components in the two legs are identified by the same numerals with the addition of an "A" or "B". The load is coupled by means of an output transformer 31 between the respective primary winding center taps 15A and 15B, or can be connected directly between the two center taps. In place of an actual center tap on the dc source, a pair of series filter capacitors 32 and 33 are used between input dc terminals 12 and 13 to establish at their junction a dc neutral point 34 for connection via the two pairs of opposite polarity coasting thyristors, which is sufficient if the algebraic average current flowing into this node is zero. This circuit configuration can produce an ac output voltage (see the illustrated output voltage waveform) having the same properties of simultaneous voltage adjustment and harmonic reduction that normally requires a double bridge arrangement with a total of four inverter legs. The instant full bridge inverter is operated by the phase shift method, as is known in the art and described for example in the book "Principles of Inverter Circuits" by Bedford and Hoft, John Wiley & Sons, Inc., copyright 1964, Library of Congress catalog card No. 64-20078. Using the phase shift method, all of the main thyristors and coasting thyristors used to produce the selected ac output voltage can be commutated individually or sequentially by the single commutating pulse generator 17 which is selectively transformer-coupled to the two half-bridge inverter units 11A and 11B by means of auxiliary thyristors SA and SB. To obtain zero output voltage level, one coasting thyristor from each of the two inverter units have overlapping conduction periods.

A detailed analysis of a sample operation of the full bridge inverter in FIG. 6 is not believed to be necessary. It will be evident that any conducting main or coasting thyristor in the first half-bridge inverter unit is commutated off by firing auxiliary thyristor SA, and in similar fashion any conducting main or coasting thyristor in the second half-bridge inverter unit is commutated off by firing the other auxiliary thyristor SB. It will be recalled in this regard that a complete operation of the commutating pulse generator for a 20 microsecond turn-off device is only about 300 microseconds. In phase shift control, the fundamental amplitude of the output voltage is varied by adjusting the relative phase shift between the two summed primary voltages under control of control circuit 23'' between zero degrees for full output and 90° for no output voltage. Although not here illustrated, the inverter unit in FIG. 4 with coasting thyristors can be substituted for the inverter units without coasting thyristors in FIG. 3. The coasting thyristors are connected to taps on the respective primary windings and to the junction of one or more pairs of filter capacitors in series between input terminals 12 and 13 functioning as a dc neutral.

Figure 7:
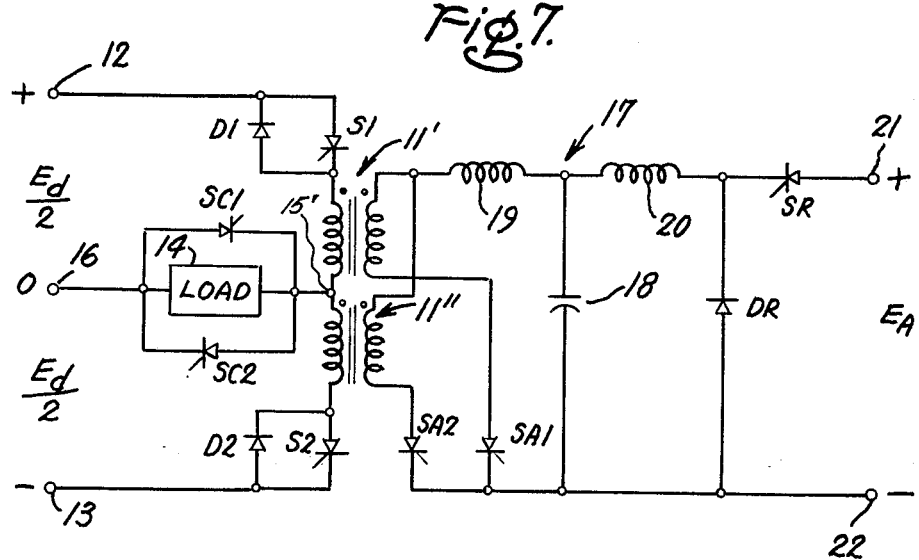
FIG. 7 is a schematic diagram of a modification of the half-bridge inverter of FIG. 4 with coasting thyristors and duplicate coupling transformers.

FIG. 7 is a modification of FIG. 4 and shows an inverter unit with coasting thyristors constructed with duplicate coupling transformers rather than a single coupling transformer. In this embodiment there are two separate coupling transformers 11' and 11'', respectively having primary windings with the same polarity that are connected in series with main thyristors S1 and S2. The two secondary windings also have the same polarity and are coupled individually to commutating pulse generator 17 by means of auxiliary thyristors SA1 and SA2. On the primary side, inverse-parallel coasting thyristors SC1 and SC2 are connected directly across the load between the midpoint 16 of the dc supply and output terminal 15' at the junction of the two primary windings. The voltage spanned by either coupling transformer 11' or 11'' is only half the dc supply voltage, so the turns ratio must be selective on this basis. Since the peak voltage applied to a main thyristor during recovery of the commutating circuit is related to the voltage that is spanned, by a factor of two for optimum performance, the voltage rating of the main thyristors in FIG. 7 can be about equal to the dc supply voltage $E_d$.

In operation, firing auxiliary thyristor SA1 turns off main thyristor S1 or coasting thyristor SC2 and firing auxiliary thyristor SA2 turns off main thyristor S2 or coasting thyristor SC1. For example, to commutate current from main thyristor S1 to coasting thyristor SC1, auxiliary thyristor SA1 and coasting thyristor SC1 are fired together. This coasting thyristor fulfills the same function as diode D2 in previous cases where thyristor S1 is commutated off. During the spanning interval, only main thyristor S1 and then feedback diode D1 conducts, and both main thyristor S2 and diode D2 are non-conductive. Accordingly, only coupling transformer 11' functions as the spanning reactor, spanning terminals 12 and 16. During the recoil interval that follows after diode D1 has blocked, coasting thyristor SC1 circulates current at a zero output voltage level, while auxiliary thyristor SA1 conducts to discharge trapped energy as before. Following the recoil interval, the commutating circuit recovers in the same manner as previously explained. The other coasting thyristor SC2 is also gated during the zero voltage portion of the load cycle so that the load current may reverse at will.

To initiate forced commutation from coasting thyristor SC1 to feedback diode D2, following which main thyristor S2 conducts at will, the other auxiliary thyristor SA2 and coasting thyristor SC2 are fired together. The latter device fulfills the same duty (bypassing the excess commutating pulse) for SC1 that a feedback diode performs for its associated main thyristor during commutation. During the spanning interval, diode D2 conducts as well as both coasting thyristors until reverse biased thyristor SC1 turns off. At the end of the spanning interval, the other coasting thyristor SC2 also blocks, so that during the recoil interval on the primary side diode D2 conducts current through the primary winding of coupling transformer 11' and the load to terminal 16. The commutating circuit continues to ring around the commutating pulse loop and consequently recovers as before. Also, when the polarity of the load current is such that forced commutation would be redundant, natural commutation can be achieved without intervention of the transformer-coupled commutating circuit. For example, load current transfers from diode D1 to coasting thyristor SC2 upon firing the latter device, and natural commutation from coasting thyristor SC2 to main thyristor S2 follows upon the firing of main thyristor S2.

Figure 8:
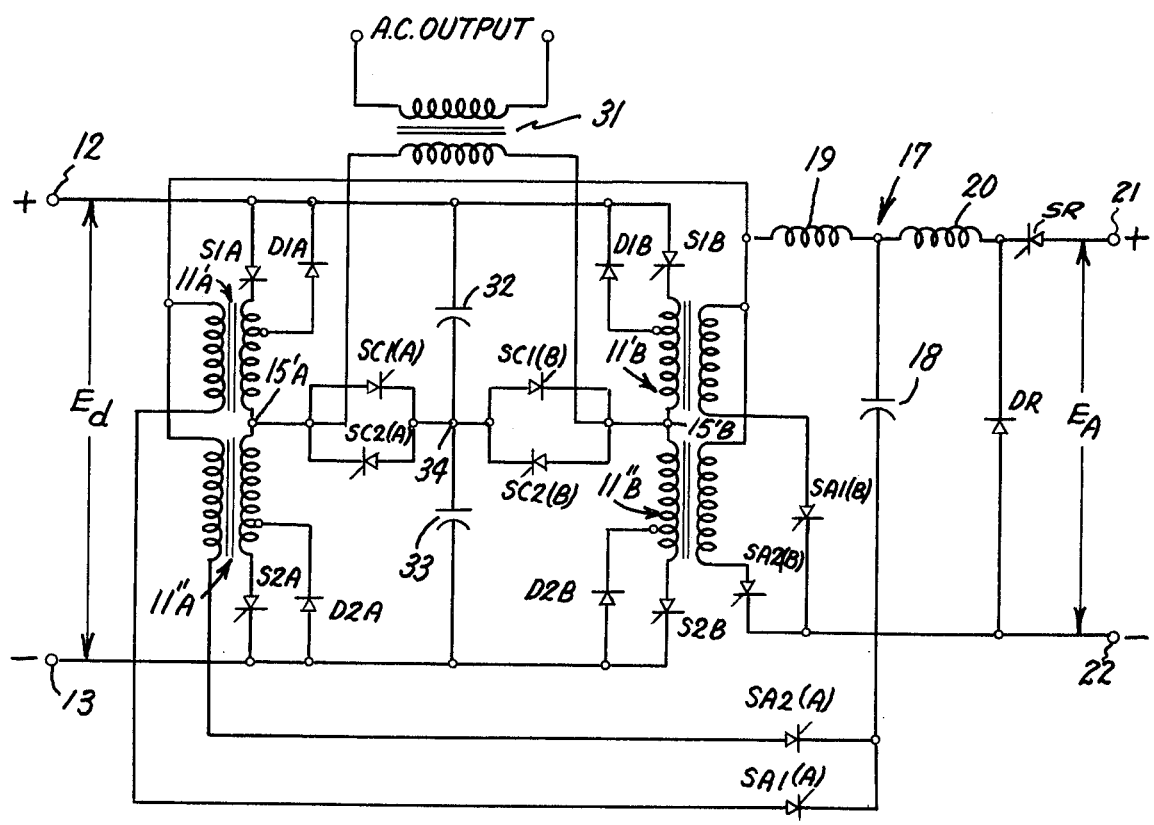
FIG. 8 is a schematic circuit diagram of a single phase full bridge inverter with coasting thyristors similar to FIG. 6 but using duplicate coupling transformers as taught in FIG. 7.

A plurality of the half-bridge inverter units in FIG. 7 can be combined together to form other inverter systems such as a three-phase bridge inverter (see FIG. 3) and a single phase full bridge inverter (see FIG. 6). FIG. 8 shows the version of the full wave bridge inverter using half-bridge inverter units with inverse-parallel coasting thyristors and duplicate coupling transformers. Components in the first and second inverter units are identified by the same numerals as in FIG. 7 followed by a "A" or "B". All four coasting thyristors are connected directly to the dc neutral point 34 between series filter capacitors 32 and 33. The single commutating pulse generator 17 is selectively coupled to the two half-bridge inverter units by means of four coupling transformers and four associated auxiliary thyristors. The operation is analogous to FIG. 6, in that selected conducting main and coasting thyristors are commutated off sequentially using a single main commutating capacitor by selective operation, one at a time, of the four auxiliary thyristors. The more complex commutating pulse generator 17' in FIG. 3 with provision for waveshaping of the commutating pulse and two-level commutating ability can, of course, be substituted for pulse generator 17 in FIG. 8 and also in FIG. 6. Furthermore, the alternative connection of the feedback diodes to taps on the coupling transformer primary windings (see FIG. 3) can also be used in these inverter configurations.

Figure 9:
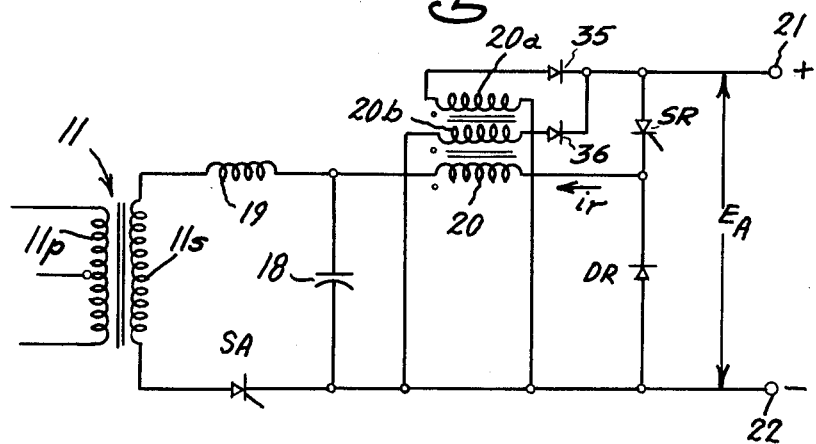
FIG. 9 illustrates a modification of the commutating pulse generator to include additional windings on the rebound inductor to clamp both polarities of commutating capacitor voltage.
Figure 10:
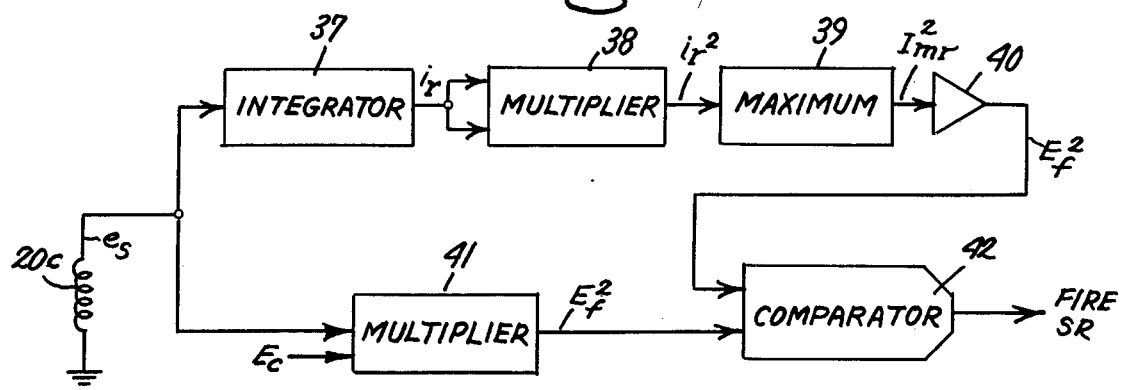
FIG. 10 is a block diagram of a recharge thyristor firing circuit for recharging the commutating capacitor to a predetermined initial voltage.

Several optional features for controlling the voltage on commutating capacitor 18 are given in FIGS. 9 and 10. In FIG. 9, rebound inductor 20 is provided with additional windings 20a and 20b to effect clamping of both polarities of the capacitor voltage at predetermined levels. To limit the recharging of capacitor 18 to an optimum initial voltage $E_c$ equal to twice the auxiliary dc supply voltage $E_A$, winding 20a has half the number of turns of winding 20 and is connected with the polarity shown in series with a diode 35 between auxiliary supply input terminals 21 and 22. When the voltage across inductor 20 becomes excessive, diode 35 is forward biased and removes excess energy. With a full bridge rectifier on winding 20a, clamping is effective for both polarities of capacitor voltage. A tertiary winding 20b in series with another diode 36, but with the opposite winding polarity, can be used to limit the negative swing of the capacitor voltage (see FIG. 2) after rebound diode DR begins to conduct. If windings 20b and 20 have approximately the same number of turns, the voltage across inductor 20 does not rise substantially above $E_A$ and the peak reverse voltage $e_{S1}$ on main thyristor S1 (and also S2) is limited.

FIG. 10 is a block diagram of an exact scheme for timing the firing of recharge thyristor SR to achieve an exact preset value of initial capacitor voltage, $E_c$, preferably equal to $2E_A$. Using control winding 20c (also see FIG. 1) to sense the voltage across the rebound inductor, the upper branch of the recharge thyristor firing control circuit utilizes the sensed voltage $e_s$ to determine the peak value of $i_r^2$ where $i_r$ is the current in rebound inductor 20. This is indicative of the square of the final voltage $E_f^2$ on capacitor 18 assuming that the rebound inductor completely discharges and recharged thyristor SR is not fired. Thus, the sensed voltage $e_s$ is fed into an integrator 37 to derive an output signal representative of $i_r$ and this output signal is squared in a multiplier 38 and the maximum value $I_{mr}^2$ determined in a peak detector 39. Amplifier 40 has a variable gain depending on whether the basic commutating pulse generator is operating or also the overcurrent commutating pulse circuit (see FIG. 3). In the other branch of the firing control circuit, another multiplier 41 has as inputs the sensed voltage $e_s$ and the desired initial capacitor voltage $E_c$. Using the relationship $E_i \cdot E_c = E_f^2$, where $E_i$ is the capacitor voltage at the time of firing recharge thyristor SR, this branch calculates the final capacitor voltage assuming recharge thyristor SR is fired at that moment. The two calculated values of $E_f^2$ are compared in a comparator 42 and a firing signal for recharge thyristor SR is generated when there is a compare.

Figure 11:
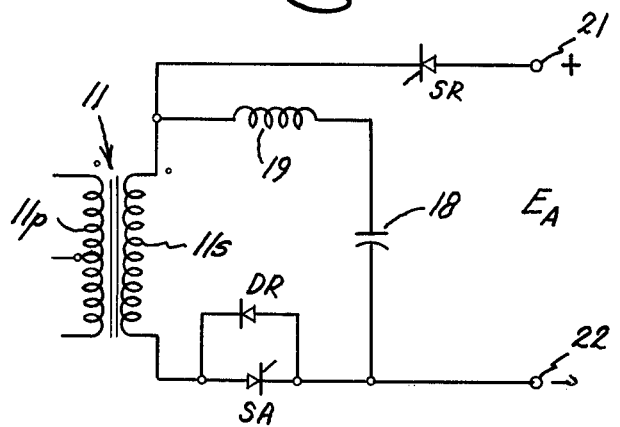
FIG. 11 is a schematic diagram of a modified form of the commutating pulse generator.
Figure 12:
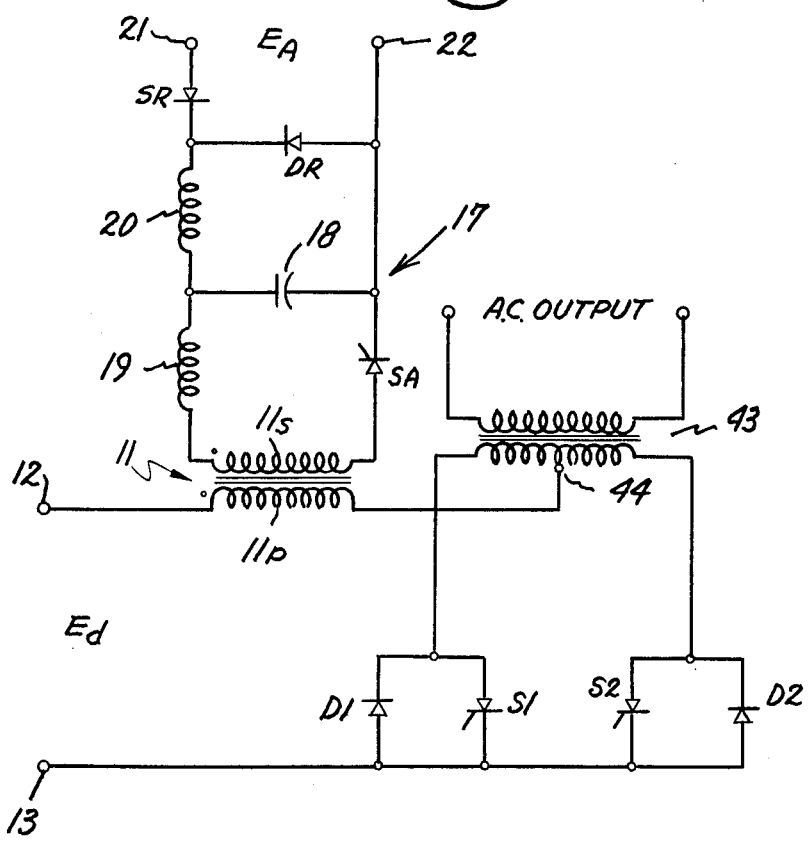
FIG. 12 is a schematic diagram of the shared transformer-coupled commutating circuit used with a thyristor inverter in the center-tapped load configuration.

FIGS. 11 and 12 relate to two aspects of the invention as more broadly defined. In the modification of the basic commutating pulse generator in FIG. 11, rebound diode DR is connected directly in inverse-parallel with auxiliary thyristor SA, and commutating inductor 19 has a dual function as the rebound inductor. Accordingly, recharge thyristor SR is connected to the junction between this inductor and coupling transformer secondary winding 11s. This form of the commutating pulse generator is less desirable than that in FIG. 1 because auxiliary thyristor SA does not turn off, and thus rebound diode DR cannot conduct, unitl all the trapped energy in the commutating pulse loop components is stored in capacitor 18 alone, which is therefore charged to a higher reverse voltage. At an appropriate point in the reverse oscillation through diode DR, winding 11s, and inductor 19, recharge thyristor SR is turned on to supply energy from the auxiliary dc supply to make up for losses and recharge capacitor 18 to the desired initial voltage. With these remarks the operation of FIG. 11 should be clear.

FIG. 12 shows application of the transformer-coupled commutating circuit to a thyristor inverter in the center-tapped load configuration. This type of inverter has an output transformer 43 with its secondary winding coupled to the load while the primary winding has a center-tap 44 which is coupled through the primary winding 11p of coupling transformer 11 to positive dc input terminal 12. Negative input dc terminal 13 is coupled through main thyristor S1 and its inverse-parallel feedback diode D1, and through main thyristor S2 and its inverse-parallel feedback diode D2, to either end of the primary winding of output transformer 43. Commutating pulse generator 17 is identical to the form in FIG. 1. In normal operation, main thyristors S1 and S2 conduct alternately to provide ac output voltage between the output terminals. To turn off main thyristor S1, for example, auxiliary thyristor SA is fired. Commutating capacitor 18 discharges through coupling transformer secondary winding 11s and generates a pulse of current that is coupled through the dc supply to first extinguish the load current in thyristor S1 after which the excess flows through feedback diode D1 while S1 recovers its blocking ability. During the spanning interval, as in FIG. 1, both feedback diodes D1 and D2 are conductive so that there is effectively no net voltage across the primary winding of output transformer 43, and center-tap 44 is therefore almost at the potential of negative input dc terminal 13. Thus, coupling transformer 11 in the same manner as in FIG. 1 functions as a spanning reactor, spanning the dc supply.

During this action, the voltage on capacitor 18 reverses. The subsequent reversal of capacitor current is blocked by auxiliary thyristor SA, but passes through rebound diode DR instead. In this way, the commutating capacitor swings back to the original voltage polarity, regaining much of the charge in the process and recovering energy that otherwise would be trapped. The remaining losses are made up by firing recharge thyristor SR at the appropriate time in the cycle. The incoming main thyristor S2 is also gated on, allowing the load current to reverse at will. The inverter unit in FIG. 12 can also be used a building block in polyphase and other inverter systems. In this case, as in FIG. 3, there is a single commutating pulse generator and multiple coupling transformers, one for each inverter unit, which are selectively coupled to the pulse generator by multiple auxiliary thyristors. The other modifications and variations that have been described can also be applied to such inverter systems.

In summary, the problems listed in the background of the invention section are overcome by following features of the present invention (the numbers correspond).

1. Transformer isolation allows the main dc power supply and the auxiliary commutating circuit supply to be adjusted independently, so that the commutating current capability is constant or some desired function of the output voltage. The size of the commutating capacitor is selected with reference to the maximum main dc supply voltage.

2. Only one commutating capacitor is required for a large number of main thyristors.

3. Only one auxiliary thryistor (or two if duplicate coupling transformers are used) is required for each pair of main thyristors, plus one device for recharging the capacitor.

4. When conditions are such that forced commutation would be redundant, generation of an unnecessary pulse can be avoided by suppressing the firing of auxiliary thyristors. The load current will commutate naturally from a previously conducting feedback diode to the incoming main thyristor.

5. Since redundant commutating pulses are not generated, the commutating circuit is ready to perform a necessary commutation at the instant an overload condition is detected.

6. One commutating capacitor can be sized to extinguish normal load currents. By using one extra auxiliary thyristor and diode, a second capacitor can be connected in parallel with the first whenever an overload condition is detected. This will increase the effeciency of the equipment in normal operation.

7. Since there is only one commutating pulse generator, the waveform can be shaped (into a square pulse having low initial di/dt, for example) by the addition of a few extra components.

8. With suitable design of the circuit, there are no inevitable losses: all the trapped energy can theoretically be recovered.

9. The trapped energy is used to charge the commutating capacitor for the next commutation; some energy is fed back into the main dc source by the commutating pulse.

10. Opposing polarity coasting thyristors are easily added to the inverter to make possible a third (zero) level of output voltage, and are commutated off in the same manner by the commutating circuit.

The improved thyristor inverters herein described have utility in various inverter applications including, for example, adjustable speed ac motor drives and uninterruptible power supplies.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. An inverter circuit comprising
at least one half-bridge inverter unit including first and second main thyristors connected in series between a pair of input unidirectional voltage supply terminals for alternate conduction of current selectively through the primary winding means of coupling transformer means to provide alternating-current output voltage at an output terminal, and feedback rectifier means in parallel with each main thyristor,
said coupling transformer means shaving inductively coupled secondary winding means and functioning as a spanning reactor and to couple commutating current pulses to said main thyristors that are produced by a single commutating pulse generator,
said commutating pulse generator including a main commutating capacitor and at least one series-connected auxiliary thyristor for initiating discharge of said main commutating capacitor selectively through said secondary winding means, rebound circuit means comprising a rebound rectifier and rebound inductor in series across said main commutating capacitor to recover trapped energy, and a recharge thyristor effectively connected in series with said main commutating capacitor and rebound inductor between a pair of auxiliary supply input terminals for independently recharging said main commutating capacitor to an initial voltage with the same polarity which, upon transformation into the primary winding means, is high enough to assure return of excess commutating pulse energy to the input terminals, and
control means for rendering said thyristors conductive in a prescribed sequence.

2. The inverter circuit according to claim 1 wherein said coupling transformer means is a single transformer and said primary winding means is a center-tapped primary winding with said output terminal effectively connected to the center tap thereof, said rebound rectifier and rebound inductor in said commutating pulse generator further being connected directly across said main commutating capacitor.

3. The inverter circuit according to claim 2 wherein said feedback rectifier means is comprised by a diode directly in inverse-parallel with the respective main thyristor.

4. The inverter circuit according to claim 2 wherein said main thyristors respectively have one terminal adjacent either end of said center-tapped primary winding, and said feeback rectifier means is comprised by a diode in inverseparallel between the other terminal of the respective main thyristor and a tap on said primary winding to thereby apply a reverse voltage to the corresponding main thyristor during commutation.

5. The inverter circuit according to claim 2 further including means for establishing another terminal at the mid-point of the input unidirectional voltage supply, and opposing polarity coasting thyristors respectively coupled between said other terminal and taps on said primary winding at either side of the center tap thereof, to thereby also selectively provide a zero output voltage level under control of said control means, said coasting thyristors also being commutated by commutating current pulses generated by said commutating pulse generator upon rendering conductive said auxiliary thyristor.

6. The inverter circuit according to claim 1 wherein said coupling transformer means with inductively coupled primary and secondary winding means comprises a pair of coupling transformers with the primary windings thereof in series with said main thyristors, and with said output terminal effectively connected to the junction between the primary windings, one secondary winding being coupled across said main commutating capacitor by said auxiliary thyristor while the other secondary winding is coupled across said main commutating capacitor by another auxiliary thyristor, said rebound rectifier and rebound inductor further being connected directly across main commutating capacitor.

7. The inverter circuit according to claim 6 wherein said feedback rectifier means is comprised by a diode directly in inverse-parallel with the respective main thyristor.

8. The inverter circuit according to claim 6 wherein said main thyristors respectively have one terminal adjacent the far ends of said primary coupling transformer windings, and said feedback rectifier means is comprised by a diode in inverse-parallel between the other terminal of the respective main thyristor and a tap on the corresponding primary winding to thereby apply a reverse voltage to the respective main thyristor during commutation.

9. The inverter circuit according to claim 6 further including means for establishing another terminal at the midpoint of the input unidirectional voltage supply, and opposing polarity coasting thyristors respectively coupled between said other terminal and the junction between said primary windings to selectively provide a zero output voltage level under control of said control means, said coasting thyristors also being commutated by commutating current pulses generated by said commutating pulse generator upon rendering conductive one of said auxiliary thyristors.

10. The inverter circuit according to claim 1 wherein said rebound rectifier and rebound inductor in said commutating pulse generator are connected directly across said main commutating capacitor, and said commutating pulse generator further includes a first commutating inductor coupled in series with said main commutating capacitor and auxiliary thyristor across said secondary winding means, and a commutating pulse waveshaping circuit comprising a second commutating capacitor and commutating inductor in series across said main commutating capacitor and first commutating inductor which are tuned to resonate at the third harmonic of the fundamental pulse frequency.

11. The inverter circuit according to claim 1 wherein said rebound rectifier and rebound inductor in said commutating pulse generator are connected directly across said main commutating capacitor, and said commutating pulse generator further includes a first commutating inductor coupled in series with said main commutating capacitor and auxiliary thyristor across said secondary winding means, and an overcurrent commutating pulse circuit comprising a second commutating capacitor in series with a second commutating inductor and overcurrent auxiliary thyristor and inverseparallel diode all connected across said main commutating capacitor and first commutating inductor, and means for sensing a load overcurrent and concurrently rendering conductive said overcurrent auxiliary thyristor with said first-mentioned auxiliary thyristor to thereby generate a higher magnitude commutating current pulse.

12. The inverter circuit according to claim 1 wherein said rebound rectifier and rebound inductor in said commutating pulse generator are connected directly across said main commutating capacitor, said rebound inductor further having an additional inductively coupled control winding for sensing the voltage thereacross, the sensed voltage and a desired main commutating capacitor initial voltage being used as inputs to a recharge thyristor control circuit to generate a firing signal for said recharge thyristor timed to effect recharge of said main commutating capacitor to the desired initial voltage.

13. The inverter according to claim 12 wherein said rebound inductor has at least one additional inductively coupled winding connected in series with a diode between said auxiliary supply input terminals and operative to clamp the main commutating capacitor to a predetermined voltage.

14. An inverter circuit comprising
at least one inverter unit having a pair of input unidirectional voltage terminals and including an output transformer having a center-tapped primary winding and an inductively coupled secondary winding with a pair of output terminals, first and second main thyristors respectively connected between one input terminal and either end of said output transformer primary winding for conduction alternately to provide alternating-current output voltage between said output terminals, a coupling transformer having a primary winding connected between the other input terminal and the center tap of said output transformer primary winding, and feedback rectifier means in parallel with each main thyristor,
said coupling transformer having an inductively coupled secondary winding and functioning effectively as an input terminal spanning reactor and to couple commutating current pulses to said main thyristors that are produced by a single commutating pulse generator,
said commutating pulse generator including a main commutating capacitor and a series-connected auxiliary thyristor for initiating discharge of said main commutating capacitor through said secondary winding, rebound circuit means comprising a rebound rectifier and rebound inductor in series across said main commutating capacitor to recover trapped energy, and a recharge thyristor effectively connected in series with said main commutating capacitor for independently recharging said main commutating capacitor to an initial voltage which, upon transformation into said primary winding, is higher than the input voltage with the same polarity, and
control means for rendering said thyristors conductive in a prescribed sequence.

15. An inverter circuit comprising
a plurality of half-bridge inverter units respectively connected between a pair of input unidirectional voltage supply terminals,
each half-bridge inverter unit including first and second main thyristors connected in series with the primary winding of a respective coupling transformer for alternate conduction to provide alternating-current output voltage at an output terminal coupled to the center tap of said primary winding, and feedback rectifier means in parallel with each main thyristor,
the respective coupling transformers each having an inductively coupled secondary winding and functioning as an input terminal spanning reactor and to couple commutating current pulses to the corresponding main thyristors that are produced by a single commutating pulse generator,
said commutating pulse generator including a main commutating capacitor and a plurality of auxiliary thyristors for individually coupling the respective secondary windings across said main commutating capacitor and initiating discharge thereof, rebound circuit means for recovering trapped energy, and recharge means for independently recharging said main commutating capacitor to an initial voltage which, upon transformation into the respective primary windings, is higher than the input voltage with the same polarity, and control means for rendering said thyristors conductive in a prescribed sequence.

16. The inverter circuit according to claim 15 further including means for establishing at least one other terminal at the mid-point of the input unidirectional voltage supply, each half-bridge inverter unit further including a pair of opposing polarity coasting thyristors respectively connected between said other terminal and taps on the respective primary winding at either side of the center tap thereof, to thereby also selectively provide a zero output voltage level under control of said control means, said coasting thyristors also being commutated by commutating current pulses generated by said commutating pulse generator upon rendering conductive the corresponding auxiliary thyristor.

17. The inverter circuit according to claim 16 wherein said commutating pulse generator further includes a commutating inductor in series with and adjacent said main commutating capacitor, said rebound circuit means comprises a rebound diode and rebound inductor in series directly across said main commutating capacitor, and said recharge means comprises a recharge thyristor effectively in series with said rebound inductor and main commutating capacitor between a pair of auxiliary supply input terminals, said control means further being operative to selectively render conductive said recharge thyristor following conduction of one of said auxiliary thyristors.

18. The inverter circuit according to claim 15 wherein said rebound circuit means comprises a rebound rectifier and rebound inductor in series directly across said main commutating capacitor, and said recharge means comprises a recharge thyristor effectively in series with said rebound inductor and main commutating capacitor between a pair of auxiliary supply input terminals, said control means further being operative to selectively render conductive said recharge thyristor following conduction of one of said auxiliary thyristors.

19. The inverter circuit according to claim 18 wherein said feedback rectifier means is comprised by a diode directly in inverse-parallel with the respective main thyristor.

20. The inverter circuit according to claim 18 wherein the main thyristors of each inverter unit have one terminal adjacent either end of the corresponding center-tapped primary winding, and said feedback rectifier means is comprised by a diode in inverse-parallel between the other terminal of the respective main thyristor and a tap on said primary winding to thereby apply a reverse voltage to the respective main thyristor.

21. The inverter circuit according to claim 18 wherein said commutating pulse generator further includes a first commutating inductor in series with said main commutating capacitor, and a commutating pulse waveshaping circuit comprising a second commutating capacitor and commutating inductor in series across said main commutating capacitor and first commutating inductor which are tuned to resonate at the third harmonic of the fundamental pulse frequency.

22. The inverter circuit according to claim 18 wherein said commutating pulse generator further includes a first commutating inductor in series with said main commutating capacitor, and an overcurrent commutating pulse circuit comprising a second commutating capacitor in series with a second dommutating inductor and overcurrent auxiliary thyristor and inverse-parallel diode all connected across said main commutating capacitor and first commutating inductor, and means for sensing a load overcurrent and concurrently rendering conductive said overcurrent auxiliary thyristor with one of said first-mentioned auxiliary thyristors to thereby generate a higher magnitude commutating current pulse.

23. The inverter circuit according to claim 18 wherein said rebound inductor has at least one inductively coupled control winding connected in series with a diode between said auxiliary supply input terminals and operative to clamp the main commutating capacitor to a predetermined voltage.

24. The inverter circuit according to claim 18 wherein said rebound inductor further has an inductively coupled control winding for sensing the voltage thereacross, and a recharge thyristor control circuit utilizing the sensed voltage and a desired main commutating capacitor initial voltage as inputs to generate a firing signal for said recharge thyristor timed to effect recharge of said main commutating capacitor to the desired initial voltage.

25. An inverter circuit comprising a plurality of half-bridge inverter units respectively connected between a pair of input unidirectional voltage supply terminals, each half-bridge inverter unit including first and second main thyristors connected in series with the primary windings of a pair of coupling transformers for alternate conduction to provide alternating-current output voltage at an output terminal effectively coupled to the junction of said primary windings, and feedback rectifier means in parallel with each main thyristor, each pair of coupling transformers respectively having separate inductively coupled secondary windings and functioning as spanning reactors and to couple commutating current pulses selectively to the respective main thyristors that are produced by a single commutating pulse generator, said commutating pulse generator including a main commutating capacitor and a plurality of auxiliary thyristors for individually coupling all the secondary windings across said main commutating capacitor and initiating discharge thereof, rebound circuit means for recovering trapped energy, and recharge means for independently recharging said main commutating capacitor to an initial voltage which, upon transformation into the associated primary winding, is higher than one-half the input voltage and has the same polarity, and control means for rendering said thyristors conductive in a prescribed sequence.

26. The inverter circuit according to claim 25 further including means for establishing at least one other terminal at the mid-point of the unidirectional voltage supply, each half-bridge inverter unit further including a pair of opposing polarity coasting thyristors respectively connected between said other terminal and the junction of said primary windings, to thereby also selectively provide a zero output voltage level under control of said control means, said coasting thyristors also being commutated by commutating current pulses generated by said commutating pulse generator upon rendering conductive a selected auxiliary thyristor.

27. The inverter circuit according to claim 26 wherein said commutating pulse generator further includes a commutating inductor in series with an adjacent said main commutating capacitor, said rebound circuit means comprises a rebound diode and rebound inductor directly in series across said main commutating capacitor, and said recharge means comprises a recharge thyristor effectively in series with said rebound inductor and main commutating capacitor between a pair of auxiliary supply input terminals, said control means further being operative to selectively render conductive said recharge thyristor following conduction of one of said auxiliary thyristors.

28. The inverter circuit according to claim 25 wherein said rebound circuit means comprises a rebound rectifier and rebound inductor in series directly across said main commutating capacitor, and said recharge means comprises a recharge thyristor effectively in series with said rebound inductor and main commutating capacitor between a pair of auxiliary supply input terminals, said control means further being operative to selectively render conductive said recharge thyristor following conduction of one of said auxiliary thyristors.

* * * * *